Dec. 19, 1933.  A. HOPKINS ET AL  1,939,815
METHOD OF PREPARING AND SETTING TILES AND SIMILAR ARTICLES
Filed Feb. 15, 1932
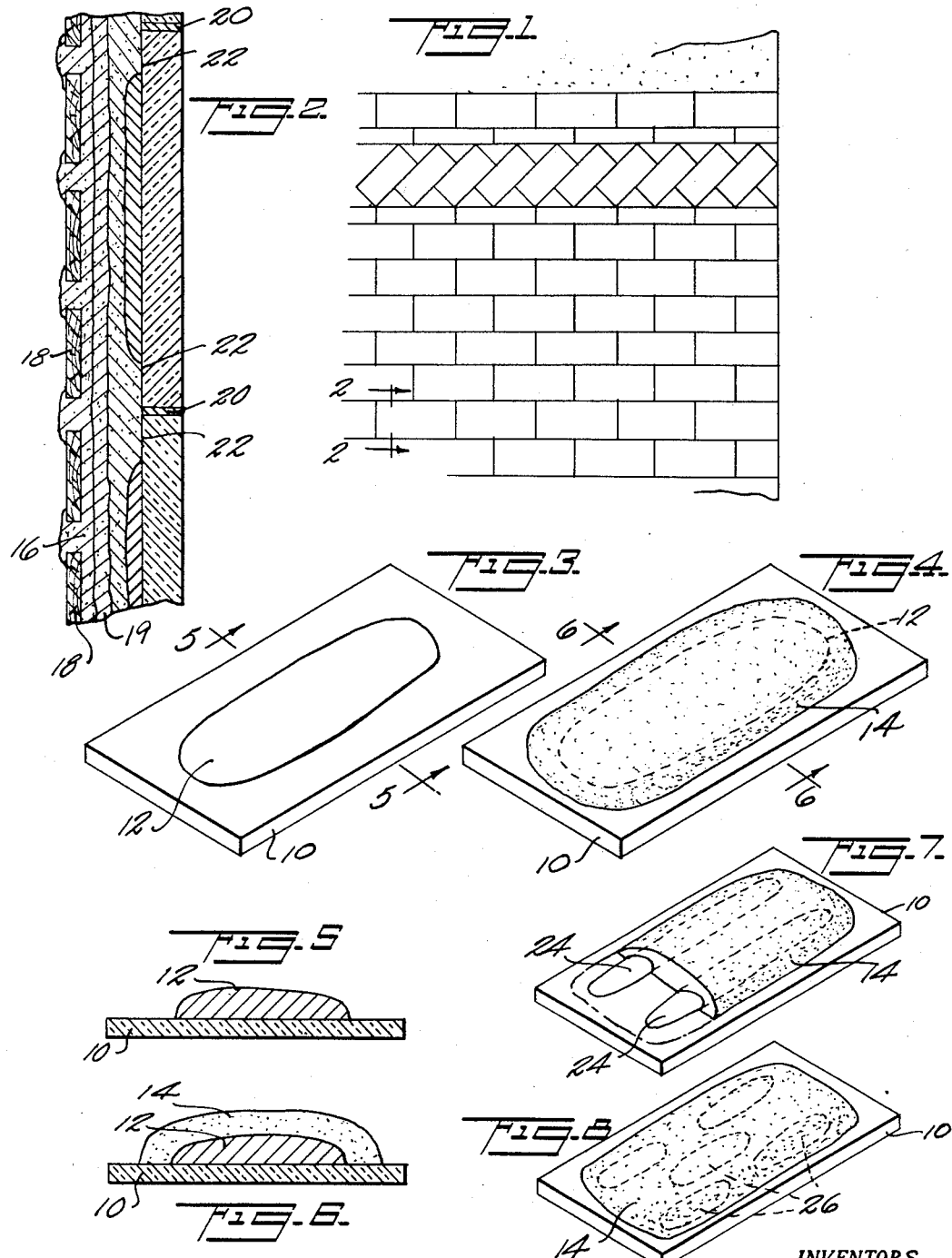
INVENTORS
Alexander Hopkins
George Thompson
BY
Edwin H. Owen ATTORNEY Patented Dec. 19, 1933

1,939,815

UNITED STATES PATENT OFFICE 1,939,815

METHOD OF PREPARING AND SETTING TILES AND SIMILAR ARTICLES

Alexander Hopkins and George Thompson, New York, N. Y., assignors of one-half to said Hopkins and one-half to George W. Cooper, both of New York, N. Y.

Application February 15, 1932. Serial No. 592,962

4 Claims. (Cl. 72—18)

Our invention relates to a method of preparing and setting tiles, slabs or similar articles particularly glass or other vitreous articles.

The principal object of our invention is to prepare glass tiles, slabs or like members with a preparation which will permit expansion or contraction to take place within individual tiles after they are set on a wall or other surface.

One method of procedure is to prepare one surface of each of the said tiles with applications of a limited quantity of non-hardening plastic cement which will retain its elastic and adhesive qualities as long as it is protected from direct contact with the atmosphere, then applying a coating of mortar or similar cement substance (which will harden when set) over the said plastic cement. The tile thus prepared is then ready to be applied to a wall or other surface.

Another method of procedure, known as "floating", is to apply only the plastic cement to the tile member, then apply the tile directly to a wall or like structure, upon which a fresh coating of mortar or similar substance has been floated.

By these methods, the plastic cement, covering a limited area or areas of each tile, is completely submerged in the wall plaster or mortar, which thus seals the plastic cement from the atmosphere, thereby preventing same from hardening or losing its elastic qualities.

When the tiles are first set in place the mortar surrounding the plastic cement, holds the tiles in place in the usual way, there being sufficient tile surface exposed beyond the edges of the plastic cement for the mortar surrounding same to adhere to, and this surrounding mortar portion will continue to be the main factor for holding the tiles in place, while the temperature changes in the vicinity do not vary enough to cause the tiles to expand or contract. When, however, the temperature changes are such as to cause expansion or contraction, the tendency is for each tile to break away partially or wholly from the mortar portions adhering thereto. Now the work of retaining the tiles in their proper position is taken up by the plastic cement, which has all the adhesive qualities necessary for substantially supporting the tiles, and any further temperature changes will have no effect upon the tiles.

The use of glass structures for tiles and the like, for use in surfacing walls, floors, etc. has been retarded because of the relatively high coefficient of expansion of glass in comparison to its supporting base. As soon as expansion would occur the glass would ordinarily crack or the tiles would become loose.

By use of the method described according to our invention, the changes in temperature and resulting expansion or contraction have no effect on the glass structure, and the permanent adhesive quality of the plastic cement will hold the tiles in place indefinitely.

The above and other features of our invention are described and illustrated in the accompanying specification and drawing in which, Fig. 1 illustrates a fragmentary elevation of a tiled wall, Fig. 2 is an enlarged section taken along the lines 2—2 on Fig. 1, showing the wall structure with tiles set in place, Fig. 3 is a perspective view of a tile having an application of plastic cement thereon, Fig. 4 is a view similar to Fig. 3, showing the same tile with an application of mortar over the plastic cement, Fig. 5 is a cross section taken along the lines 5—5 on Fig. 3, Fig. 6 is a cross section taken along the lines 6—6 on Fig. 4, Fig. 7 is a perspective view of a tile showing plastic cement applied in strips, and Fig. 8 is a perspective view of a tile showing plastic cement applied in a plurality of portions on the tile surface.

In order to illustrate our method of preparing and setting tiles, we have chosen one form of tile known as geometrical shaped tiles, but it is to be understood that our process may be used for various other forms of tiles or similar structures.

Referring to Fig. 3, a tile 10 is shown with an application of plastic cement 12 thereon. Said plastic cement may comprise a mixture of any suitable plastic material, which has the necessary adhesive characteristics and non-hardening qualities, when kept sealed from contact with the atmosphere. This plastic cement may be applied in any suitable way but due to its extremely adhesive nature, it has been found most practical to apply same with a special form of compressor, the latter being the subject matter of another patent application.

After a sufficient quantity of the plastic cement 12 has been applied in about the proportion shown in Figs. 3 and 5, the tile may be applied directly to a freshly coated wall having a surface coating of mortar floated thereon or a coating of mortar may be applied over the plastic cement as indicated at 14, Fig. 4, a process known in the trade as buttering.

Considering the latter or buttering method first, the wall structure shown in Fig. 2 is prepared with a scratch coat of plaster or mortar 16 which adheres to the lath 18 in the usual way, then a skin coat 19 of a similar or the same mixture is applied over the scratch coat. This wall surfacing is produced by methods well known in the plastering art, therefore, forms no part of our invention, and can be modified to suit the individual style of the person applying same, the important feature being to have a substantial undercoating of plaster or mortar to apply the buttered tiles to.

After applying the mortar 14 to individual tiles 10, they are set in place on the wall surface, one along side of the other in proper alignment, and beat in until the desired face level is reached. See Fig. 2. During the beating in process the mortar will be flattened out, some of which will be forced out through the spaces 20 left between the edges of adjacent tiles. This portion of the mortar, if allowed to remain in the spaces 20 would not permit the tiles to expand when the higher temperature occurred, therefore, the spaces are cleared by inserting the end of a trowel or other suitable tool, before the mortar hardens. After cleaning these said spaces 20, they are pointed up with plastic cement, commonly known as grouting, the outer surface of which will harden somewhat, due to its contact with air.

After the tiles are set and the mortar has hardened, the tiles are retained in place against the wall surface by both the mortar and the plastic cement, the mortar maintaining its grip along the outer surface, indicated at 22, Fig. 2, or that portion which lies beyond the outer edge of the plastic cement, while the central portions of said tiles are held by the plastic cement. When expansion occurs, the tiles will actually become loosened from the mortar 14 along the portions 22 but will be retained in position by the plastic cement 12. The expansion of course is very minute and will vary in various portions of the tile wall surface, so under normal temperature changes, it is most probable that only in certain small areas would the tiles expand and become loosened from the mortar.

It will be observed that when the tiles are set, the plastic cement is completely surrounded by the mortar and the inner tile surface, thus sealing same from exposure to the atmosphere and preserving its plastic composition. If desired, the plastic cement may be further sealed from the atmosphere by applying waterproofing compound over same.

When the tiles are to be set on a wall over which the plaster or mortar has been floated, the tiles will have only the plastic cement applied thereto, then they will be set in place, one along side the other, with spaces between in the same manner as described for the buttered tiles. After beating said tiles in to the desired level, the finished cross section will be similar to that previously described or as illustrated in Fig. 2.

In Figs. 7 and 8 we have illustrated two modified forms of application of plastic cement to the tile, one showing said plastic cement applied in strips as at 24, Fig. 7, then covered with the mortar 14, while the second modified form illustrates a plurality of applications of the plastic cement, as at 26, Fig. 8, which is also covered with the mortar 14. Either of the above or similar forms of application, of the plastic cement may be adopted by the tile setter, the choice of same being variable, but the application of the mortar must completely cover the plastic cement.

According to practical applications of our method of tile setting, it has been found that the time for completing a tile setting job will be reduced approximately fifty percent, thus a new and improved tiled wall structure has been provided which cannot develop cracks or loose tiles and can be completed at a substantial reduction in time and cost.

Another important feature of our invention is the simplicity in which alterations or repairs are made in the replacement of tiles which are accidently cracked or chipped. After prying a tile loose from the mortar, it can be easily pulled away from the adhesive grip of the plastic cement and by applying a similar quantity of plastic cement to a new tile, it can be easily replaced. The new application of plastic cement will re-enter the cavity left by the plastic cement on the tile which was removed, and when the spaces surrounding the edges of same are pointed up, the repair will be completed.

While the method of setting tiles according to our invention is particularly adapted for the type of tiles known as geometric sized tiles and slabs of any size or shape, the same methods of procedure may be applied to the preparation and setting of a variety of work which would come within the bounds of tile and marble setting such as, setting bathroom fixtures, floor tiles, roof tiles, slate, etc.

Reference has been made to mortar throughout the specification as the substance used to cover the plastic cement, but it is to be understood that any composition of cement, plaster or substance having like quantities can be used.

Reference to the word tile which has been made is understood to mean an object having a surface measurement under twelve (12" x 12").

Reference to the word slab which has been made is understood to mean an object of unlimited size.

Having described our invention, we claim:

1. The method of preparing tiles for application to another surface, consisting in applying a quantity of non-hardening plastic cement to the back surface of said tile, then applying a quantity of mortar over the plastic cement to completely surround same.

2. The method of preparing tile for application to another surface consisting in applying separate quantities of a non-hardening plastic cement on one surface of said tile, then applying a quantity of mortar covering all of the plastic cement.

3. The method of preparing tile for application to another surface, consisting in applying a non-hardening plastic cement in strips along one surface of said tile, then completely covering said strips with mortar.

4. The method of applying tiles to another surface, consisting in applying a quantity of non-hardening plastic cement to one surface of said tiles, and covering said plastic cement with mortar, then setting said tiles in place with a slight separation between their edges, cleaning mortar out from between said separations and pointing up said separations with the non-hardening plastic cement.

ALEXANDER HOPKINS.
GEORGE THOMPSON.